United States Patent
Shieh et al.

(10) Patent No.: US 10,823,384 B1
(45) Date of Patent: Nov. 3, 2020

(54) WIRELESS INDUCTION LAMP FOR EMITTING LIGHT USING WIRELESS ELECTRIC ENERGY

(71) Applicant: DS POWER CO., LTD., Hsinchu (TW)

(72) Inventors: Shen-Jye Shieh, Hsinchu (TW); Ching-Yuan Huang, Hsinchu (TW); Chih-Hsiung Yu, Hsinchu (TW); Li-Han Chen, Hsinchu (TW); Ju-Chun Liu, Hsinchu (TW); Kai-Yi Chou, Hsinchu (TW)

(73) Assignee: DS Power Co., Ltd., Hsinchu (TW)

( * ) Notice: Subject to any disclaimer, the term of this patent is extended or adjusted under 35 U.S.C. 154(b) by 0 days.

(21) Appl. No.: 16/690,460

(22) Filed: Nov. 21, 2019

(30) Foreign Application Priority Data

Oct. 8, 2019 (TW) .............................. 108136401 A

(51) Int. Cl.
F21V 23/02 (2006.01)
A01K 63/06 (2006.01)
H02J 50/12 (2016.01)

(52) U.S. Cl.
CPC ............ *F21V 23/026* (2013.01); *A01K 63/06* (2013.01); *H02J 50/12* (2016.02)

(58) Field of Classification Search
CPC .............................. H02J 50/12; F21Y 2115/10
See application file for complete search history.

(56) References Cited

U.S. PATENT DOCUMENTS

| 9,341,357 | B2* | 5/2016 | Hollinger | H04N 5/2256 |
| 10,174,893 | B2* | 1/2019 | Kim | F21K 9/60 |
| 2019/0191535 | A1* | 6/2019 | Hikmet | F21K 9/232 |
| 2019/0383447 | A1* | 12/2019 | Zolotykh | H01F 27/2804 |

FOREIGN PATENT DOCUMENTS

| CN | 204943119 U | 1/2016 |
| CN | 209399261 U | 9/2019 |
| CN | 209431171 U | 9/2019 |
| EP | 3290788 A1 | 3/2018 |
| TW | M454664 U | 6/2013 |

OTHER PUBLICATIONS

Communication From Taiwan Patent Office Regarding a Corresponding Foreign Application Dated (TW Year 109) dated Feb. 19, 2020.

* cited by examiner

*Primary Examiner* — Robert J May
(74) *Attorney, Agent, or Firm* — Rosenberg, Klein & Lee

(57) ABSTRACT

A wireless induction lamp includes a transmitter device for emitting wireless electric energy to a lamp receiver device, and the lamp receiver device includes a lamp housing having a transparent part disposed thereon, and a wireless light emitting device is disposed inside the lamp housing and in the transparent part. A first induction coil is disposed around on an outer edge of the wireless light emitting device, and receives the wireless electric energy of the transmitter device, to provide electric energy to the wireless light emitting device to emit light. The wireless induction lamp can wirelessly transmit electrical power to the light emitting element to emit light, so as to reduce disposal of electric wires, and the wireless light emitting device can be turned on/off by just changing a posture angle of the lamp housing to move close to or away from the electromagnetic range of the transmitter device.

10 Claims, 4 Drawing Sheets

WIRELESS INDUCTION LAMP FOR EMITTING LIGHT USING WIRELESS ELECTRIC ENERGY

This application claims priority for Taiwan (R.O.C.) patent application no. 108136401 filed on Oct. 8, 2019, the content of which is incorporated by reference in its entirely.

BACKGROUND OF THE INVENTION

1. Field of the Invention

The present invention relates to a lighting device, more particularly to a wireless induction lamp.

2. Description of the Related Art

An aquarium can be said to be a small ecological environment. In order to create an aquarium environment suitable for biological growth, it is indispensable to feed fish periodically and provide sufficient light. Sufficient light can provide a viewer to enjoy the sight of the aquarium, and also effectively promote the growth of organisms in the aquarium, so as to create a good ecological environment.

Appropriate and sufficient light can assist growth of bacteria beneficial to fish, and also allow aquatic plants in the aquarium to perform photosynthesis to generate oxygen for fish. An appropriate lighting device is beneficial to growth of fish and maintenance of ecological abundance of the aquarium; therefore, how to select the appropriate lighting device has a profound effect on the ecology in the aquarium.

There are various available lamps with different illuminations on the market for a user to select, and the commercially available lamps are connected to a power supply to obtain power by a wired manner. However, the wired lamps have some disadvantages. First, a placement position of the wired lamp is limited by low degree of freedom in using wire. Secondly, tanks of most aquariums are transparent tanks, so the wire of the lamp is not easily hidden, and it makes overall appearance of the aquarium disorderly. Thirdly, when the wired lamp is moved, the wire of the lamp is easily dropped into the aquarium, and it may cause current leakage and occur a safety problem.

Furthermore, the conventional commercially available lamp for aquarium must be additionally provided with a switch structure to turn on/off the lamp, but the switch structure is easily damaged by frequent pressing operations for a long time, and the broken switch structure must be replaced, so the consumer suffers from money loss and extra repair time cost.

Therefore, the present invention proposes a wireless induction lamp to effectively overcome the above-mentioned conventional problems.

SUMMARY OF THE INVENTION

An objective of the present invention is to provide a wireless induction lamp which is able to wirelessly transmit electrical power to a light emitting element to emit light, thereby reducing disposal of electric wires and improving freedom degree in placing the lamp.

Another objective of the present invention is to provide a wireless induction lamp, and a wireless light emitting device of the wireless induction lamp can be turned on/off by changing a posture angle of a lamp housing of the wireless induction lamp, so as to reduce requirement for the switch device, thereby reducing cost of the wireless induction lamp and reducing loss of the switch device.

Another objective of the present invention is to provide a wireless induction lamp, and an induction coil of the wireless induction lamp is a three-dimensional coil, so as to effectively reduce an occupied area of the induction coil and increase an inductor effect, thereby extending the degree of freedom in use of the wireless induction lamp.

In order to achieve the objective, the present invention provides a wireless induction lamp comprising a transmitter device and a lamp receiver device. The transmitter device is configured to emit wireless electric energy. The lamp receiver device is configured to receive the wireless electric energy, and the lamp receiver device comprises a lamp housing, at least one wireless light emitting device, and at least one first induction coil. The lamp housing comprises a transparent part disposed thereon. The at least one wireless light emitting device is mounted in the lamp housing, and disposed corresponding in position to the transparent part. The at least one first induction coil is disposed on the lamp housing and around on an outer edge of the at least one wireless light emitting device, and configured to receive the wireless electric energy of the transmitter device, and provide electric energy to the at least one wireless light emitting device to emit light.

According to an embodiment, the lamp receiver device comprises a fastener configured to fasten on an object, and the lamp housing comprises a shaft disposed thereon, and the lamp housing is connected on the fastener through the shaft and is rotatable relative to the fastener, and when the lamp housing is rotated to make the first induction coil leave from an electromagnetic range of the wireless electric energy of the transmitter device, the first induction coil is unable to receive the wireless electric energy, and the at least one wireless light emitting device is unable to emit light.

According to an embodiment, the at least one wireless light emitting device comprises at least one light emitting element and a second induction coil connected to each other, the second induction coil receives the wireless electric energy of the first induction coil based on electromagnetic induction principle, to provide electric energy to the light emitting element to emit light, and the at least one wireless light emitting device comprises an encapsulation layer configured to enclose the at least one light emitting element and the second induction coil.

According to an embodiment, the lamp housing comprises at least one mounting groove disposed thereon and correspondingly in position to the transparent part, and configured to accommodate the at least one wireless light emitting device, and the first induction coil is disposed around to an outer edge of the at least one mounting groove.

According to an embodiment, the at least one first induction coil is formed by stacking and winding at least one coil.

The structure, operating principle and effects of the present invention will be described in detail by way of various embodiments which are illustrated in the accompanying drawings.

DETAILED DESCRIPTION OF THE PREFERRED EMBODIMENTS

Figure 1:
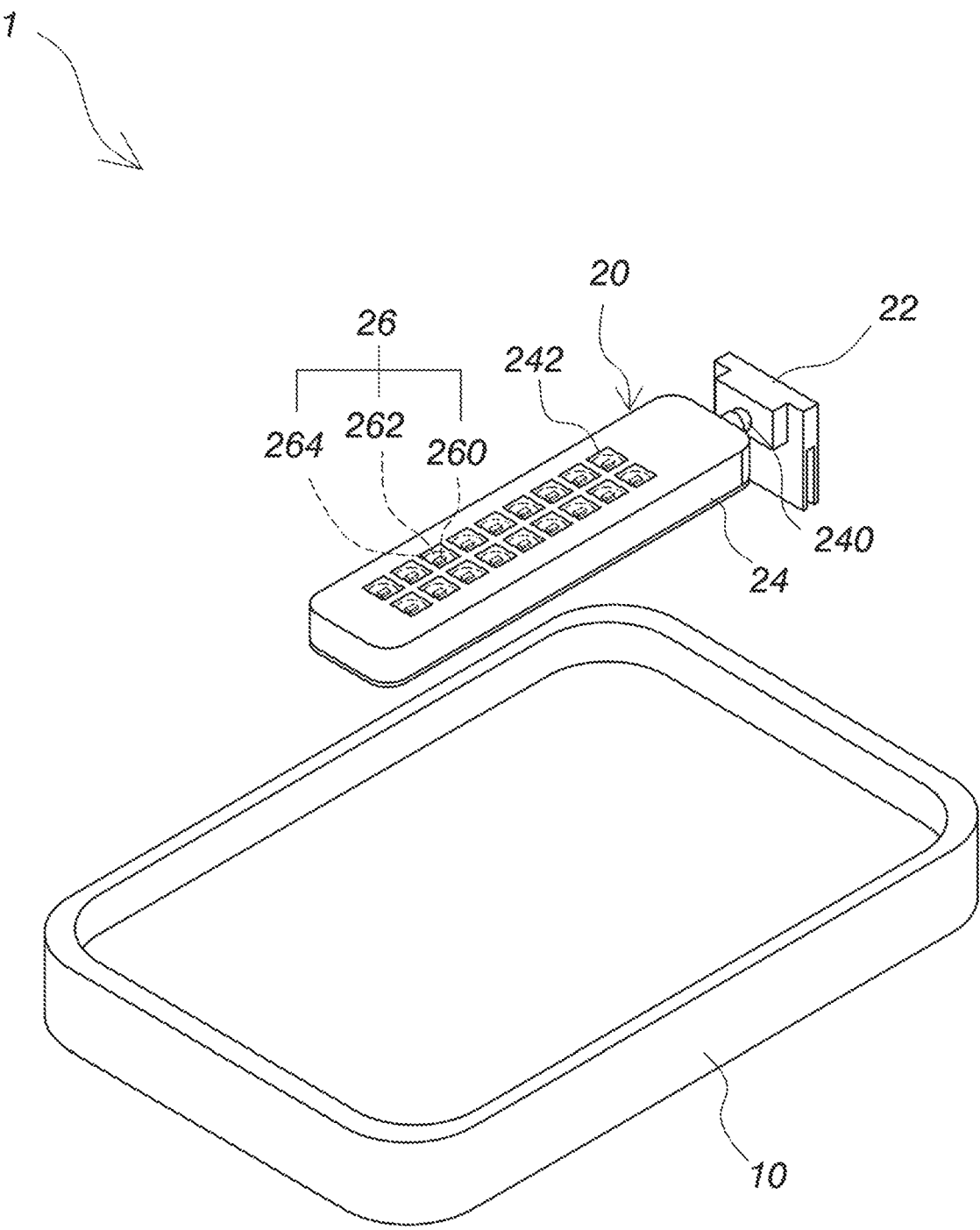
FIG. 1 is a perspective view of a wireless induction lamp of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise", "include" and "have", and variations such as "comprises", "comprising", "includes", "including", "has" and "having" will be acknowledged to imply the inclusion of stated elements but not the exclusion of any other elements.

The wireless induction lamp of the present invention utilizes a wireless charging technology, and uses a transmitter device to transmit electromagnetic wave to a lamp, so that a lamp receiver device can induce energy for emitting light. By wirelessly transmitting electrical power to the lamp for emitting light, the wireless induction lamp of the present invention can reduce requirement for electric wires, and improve degree of freedom in placing the lamp; furthermore, the wireless light emitting device can be turned on/off by just changing a posture angle of the lamp housing, so as to reduce requirement for the switch device, thereby reducing the cost of the wireless induction lamp and loss of the switch device.

Figure 2:
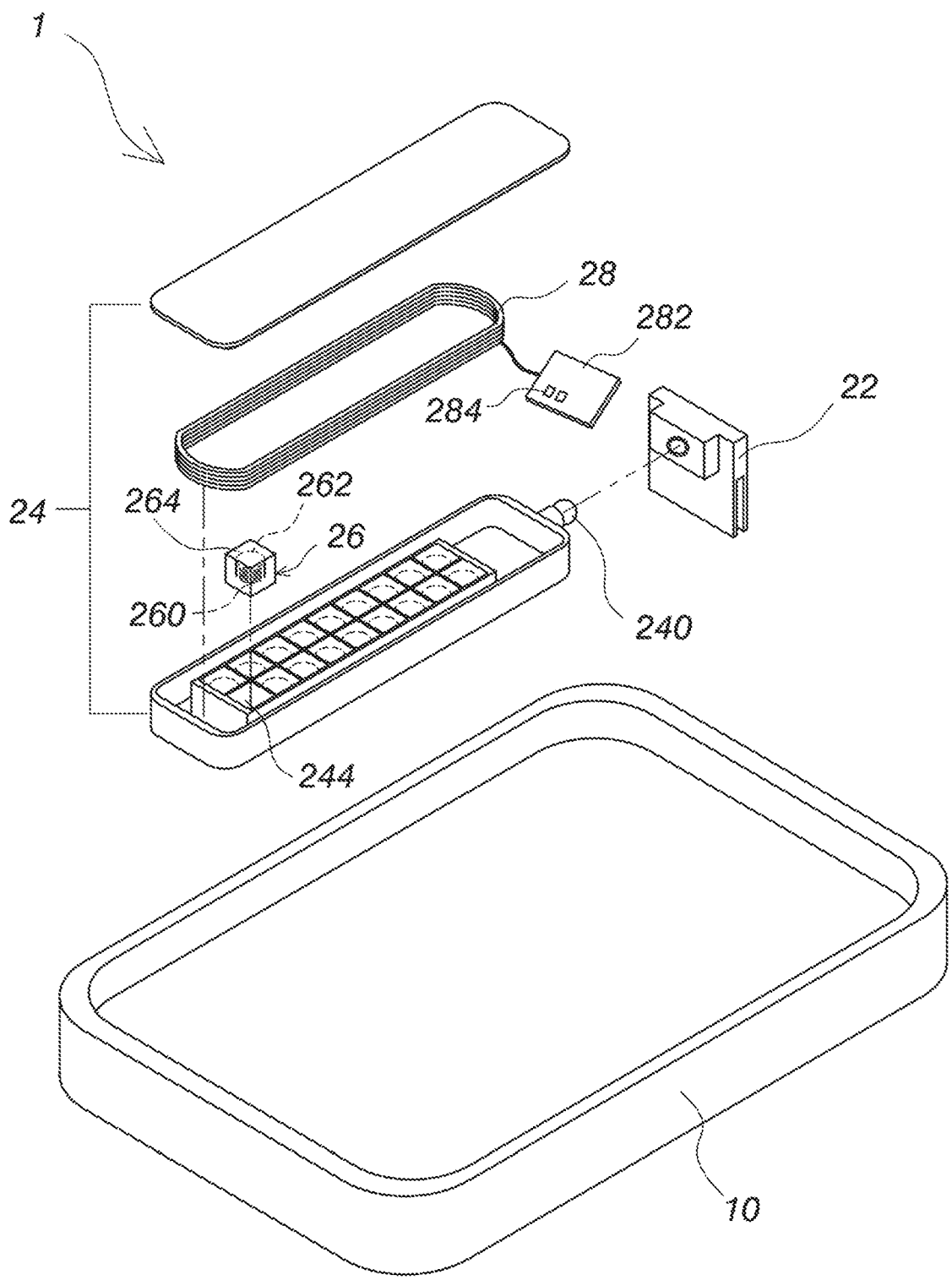
FIG. 2 is an exploded view of a wireless induction lamp of the present invention.

Please refer to FIGS. 1 and 2, which illustrate structure and effect of a wireless induction lamp 1 of the present invention in detail. A wireless induction lamp 1 can include a transmitter device 10 and a lamp receiver device 20. The transmitter device 10 emits wireless electric energy to the lamp receiver device 20, and the lamp receiver device 20 can sense the wireless electric energy, to generate electric energy for emitting light. The structure of the lamp receiver device 20 can include a fastener 22 and a lamp housing 24. The fastener 22 is used to fasten the lamp receiver device 20 on an object. The lamp housing 24 can include a shaft 240 disposed thereon; in an embodiment, the shaft 240 can be a spherical universal shaft, but the present invention is not limited to this example. The lamp housing 24 can be mounted on the fastener 22 through the shaft 240, so that the lamp housing 24 is rotatable relative to the fastener 22. In an embodiment, the lamp housing 24 can include a transparent part 242 disposed thereon, and a replaceable transparent pattern plate, which is not shown figures, can be disposed on the lamp housing 24 correspondingly in position to the transparent part 242 and configured to emit a light pattern; for example, the replaceable transparent pattern plate can be used to emit different light patterns upon demand.

As shown in FIGS. 1 and 2, the lamp housing 24 includes at least one mounting groove 244 disposed thereon and correspondingly in position to the transparent part 242. In this embodiment, the lamp housing 24 can include a plurality of rectangular mounting grooves 244 disposed thereon and arranged in rows. Each mounting groove 244 can be used to accommodate a wireless light emitting device 26, so that the wireless light emitting device 26 can be located in the transparent part 242, and the light emitted from the wireless light emitting device 26 can pass through the transparent part 242. At least one first induction coil 28 can be disposed in the lamp housing 24. In this embodiment, the first induction coil 28 can be a three-dimensional coil which is formed by upwardly stacking and winding at least one coil. Compared with the conventional spiral planar coil, the first induction coil 28 occupies a significantly smaller area and has higher degree of freedom in use, thereby increasing inductor effect. The first induction coil 28 is electrically connected to a resonance circuit board 282, and the resonance circuit board 282 includes at least one load element 284 disposed thereon. For example, the load element 284 can be a light emitting diode or a fan, and can increase power generating benefit of the first induction coil 28. The first induction coil 28 is disposed on the lamp housing 24 and around on an outer edge of the wireless light emitting device 26; in other words, the first induction coil 28 is disposed in the lamp housing 24 and around on an outer edge of the at least one mounting groove 244. When receiving wireless electric energy of the transmitter device 10, the first induction coil 28 can generate resonance effect with the wireless electric energy, to provide electric energy to the wireless light emitting device 26 for emitting light.

Please refer to FIG. 2, which illustrates a structure of the wireless light emitting device 26 of the present invention in detail. In this embodiment, the wireless light emitting device 26 can be a rectangular wireless light emitting device, the wireless light emitting device 26 comprises at least one light emitting element 260 and a second induction coil 262 which are electrically connected to each other and enclosed by an encapsulation layer 264. The encapsulation layer 264 is used to protect the light emitting element 260 and the second induction coil 262 to achieve waterproof effect, dustproof effect, and so on. The second induction coil 262 of the wireless light emitting device 26 can receive wireless electric energy of the first induction coil 28, to generate electromagnetic induction, so as to enable the light emitting element 260 to emit light.

Figure 3:
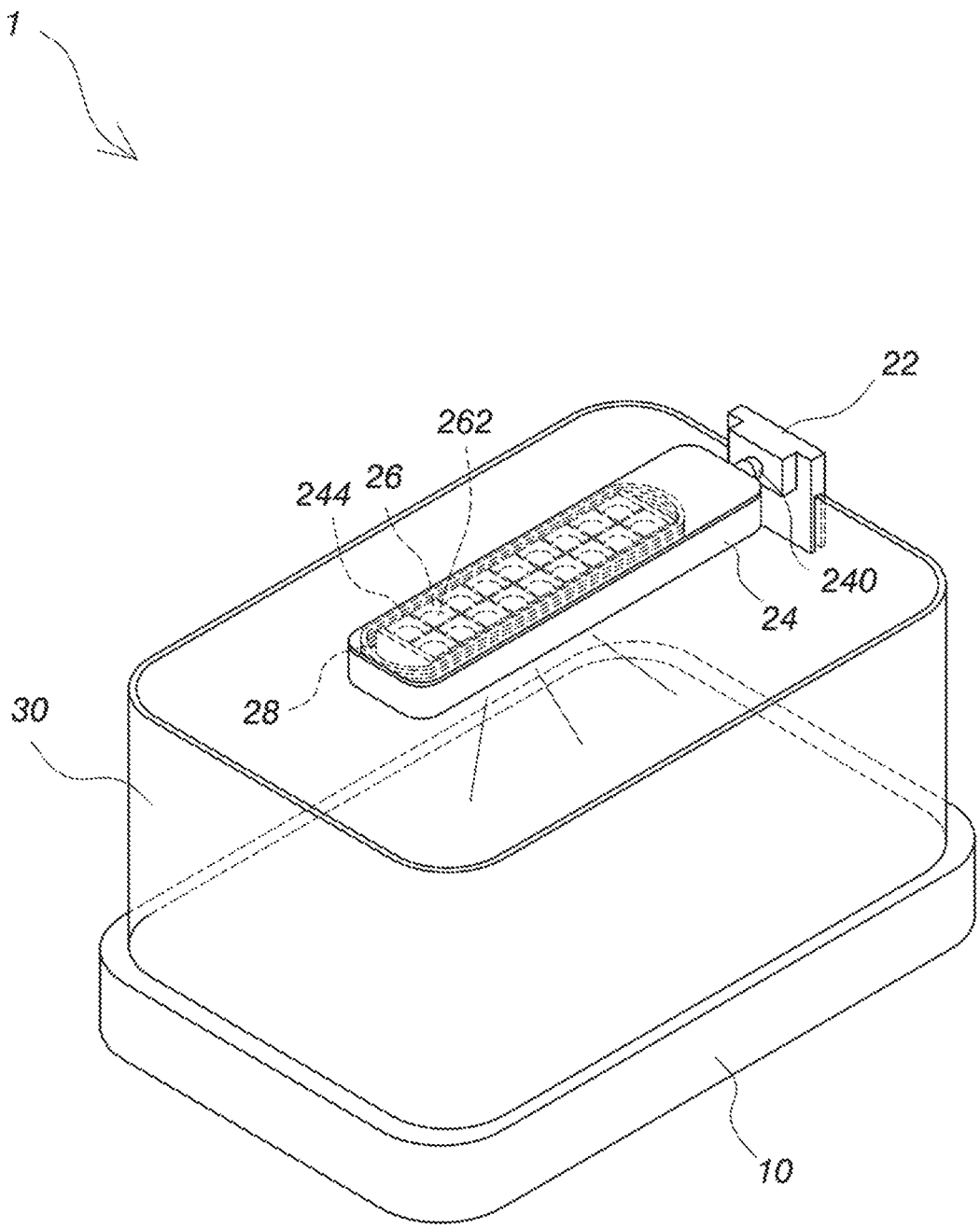
FIG. 3 is a schematic view of a wireless light emitting device in a turn-on state, according to the present invention.
Figure 4:
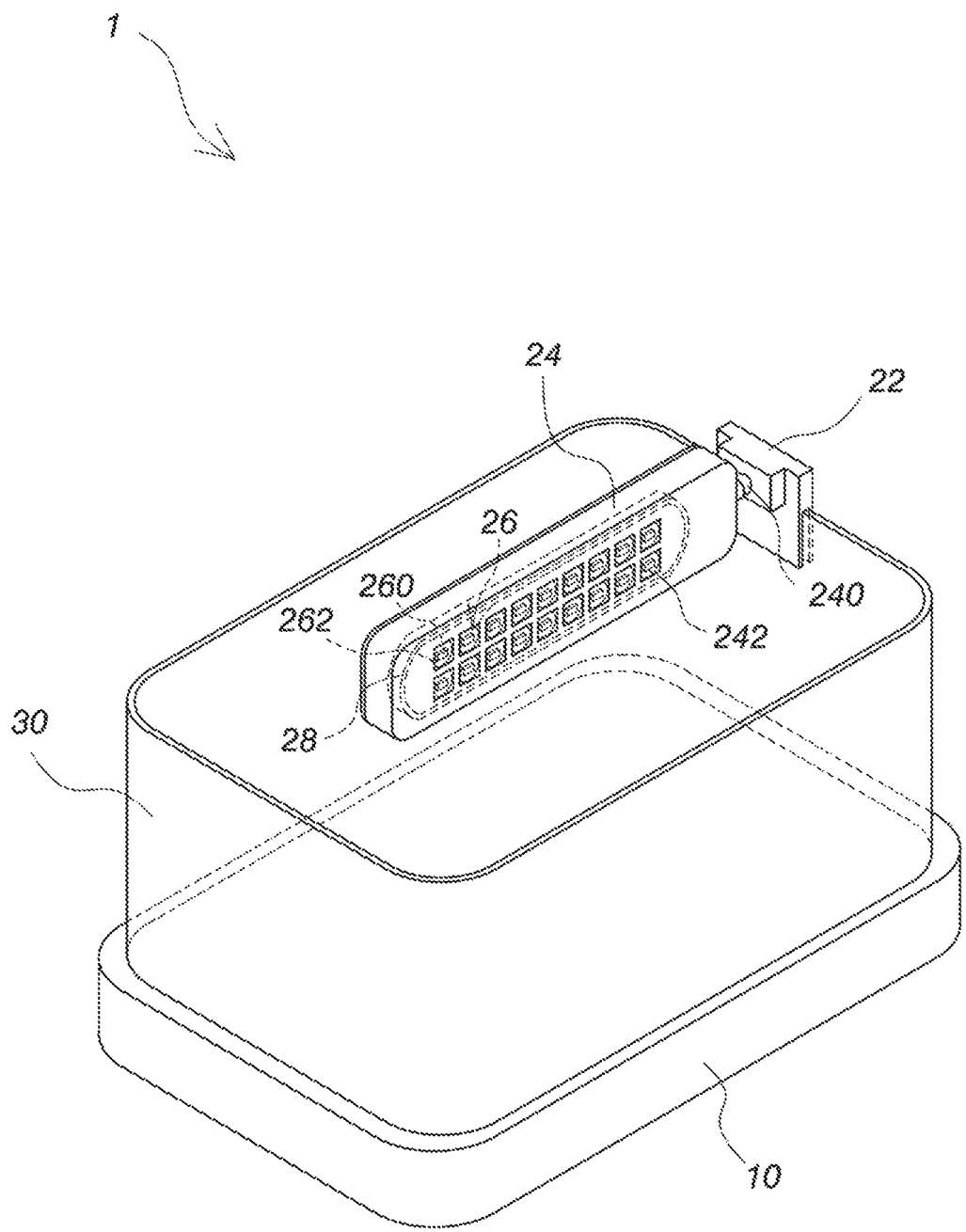
FIG. 4 is a schematic view of a wireless light emitting device in a turn-off state, according to the present invention.

Please refer to FIGS. 3 and 4, after illustration of the structure of the wireless induction lamp 1. FIGS. 3 and 4 illustrate operational states of the wireless induction lamp of the present invention. As shown in FIGS. 3 and 4, in this embodiment, the wireless induction lamp 1 is mounted on the aquarium 30, the transmitter device 10 of the wireless induction lamp 1 is mounted on a bottom of the aquarium 30, the lamp receiver device 20 is fastened on a side wall of the aquarium 30 by the fastener 22, so that the wireless induction lamp 1 can illuminate the aquarium 30.

The wireless induction lamp 1 utilizes a wireless charging technology, and the transmitter device 10 can emit wireless electric energy with frequency within a fixed frequency interval, and the first induction coil 28 is frequency-modulated and disposed in the lamp housing 24, so that the first induction coil 28 can receive the wireless electric energy to generate the resonance effect. The first induction coil 28 and the second induction coil 262 then generate electric energy through electromagnetic induction manner, and the light emitting element 260 of the wireless light emitting device 26 can receive electric power to emit light. Please refer to FIG. 3. When a user wants to turn on the wireless light emitting device 26 to emit light, the user can adjust the posture of the lamp housing 24 to make the first induction coil 28, located inside the lamp housing 24, parallel to the transmitter device 10, so that the first induction coil 28 can receive wireless electric energy of the transmitter device 10 and resonate, and the second induction coil 262 and the first induction coil 28 can generate energy through electromagnetic induction manner, thereby generating and providing electric energy to the light emitting element 260 to emit light. The second induction coil 262 of the wireless light emitting device 26 can directly receive wireless electric energy of the transmitter device 10 to generate resonance effect, so as to enable the wireless light emitting device 26 to emit light.

As shown in FIG. 4, when the user wants to turn off the wireless light emitting device 26, the user can adjust posture of the lamp housing 20 to make the lamp housing 20 and the first induction coil 28, disposed inside the lamp housing 20, perpendicular to the transmitter device 10, and after an posture angle of the first induction coil 28 is changed, the first induction coil 28 leaves the electromagnetic range of wireless electric energy of the transmitter device 10 and is unable to form resonance effect to generate and provide electric energy to the wireless light emitting device 26, and the light emitting element 260 of the wireless light emitting device 26 is unable to emit light. By adjusting the posture angle of the lamp housing 20 relative to the transmitter device 10, the wireless light emitting device 26 can be turned on/off without using additional switch device, so as to reduce requirement for the switch device, and further reduce cost of the wireless induction lamp and loss of the switch device.

According to above-mentioned contents, the wireless induction lamp can wirelessly transmit electrical power to the light emitting element for emitting light, so that disposal of electric wires can be reduced and degree of freedom in disposal of the wireless induction lamp can be improved. By transmitting electrical power wirelessly and changing the posture angle of the lamp housing to turn on/off the wireless light emitting device, the requirement for the switch device can be reduced, and the cost of the wireless induction lamp and loss of the switch device can also be decreased. Furthermore, the induction coil of the present invention can be a three-dimensional coil, so as to effectively reduce the occupied area of coil and extend the degree of freedom in use.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A wireless induction lamp, comprising:
   a transmitter device configured to emit wireless electric energy; and
   a lamp receiver device configured to receive the wireless electric energy, wherein the lamp receiver device comprises:
   a lamp housing comprising a transparent part disposed thereon;
   at least one wireless light emitting device mounted in the lamp housing, and disposed corresponding in position to the transparent part; and
   at least one first induction coil disposed on the lamp housing and around on an outer edge of the at least one wireless light emitting device, and configured to receive the wireless electric energy of the transmitter device, and provide electric energy to the at least one wireless light emitting device to emit light;
   wherein the lamp receiver device comprises a fastener configured to fasten on an object, and the lamp housing comprises a shaft disposed thereon, and the lamp housing is connected on the fastener through the shaft and is rotatable relative to the fastener, and when the lamp housing is rotated to make the first induction coil leave from an electromagnetic range of the wireless electric energy of the transmitter device, the first induction coil is unable to receive the wireless electric energy, and the at least one wireless light emitting device is unable to emit light.

2. The wireless induction lamp according to claim 1, wherein the shaft is a spherical universal shaft.

3. The wireless induction lamp according to claim 1, wherein the at least one wireless light emitting device comprises at least one light emitting element and a second induction coil connected to each other, the second induction coil receives the wireless electric energy of the first induction coil, to provide the electric energy to the light emitting element to emit light, and the at least one wireless light emitting device comprises an encapsulation layer configured to enclose the at least one light emitting element and the second induction coil.

4. The wireless induction lamp according to claim 1, wherein the lamp housing comprises at least one mounting groove disposed thereon and correspondingly in position to the transparent part, and configured to accommodate the at least one wireless light emitting device, and the first induction coil is disposed around to an outer edge of the at least one mounting groove.

5. The wireless induction lamp according to claim 4, wherein the at least one mounting groove comprises a plurality of mounting grooves arranged in rows.

6. The wireless induction lamp according to claim 4, wherein the at least one mounting groove is a rectangular mounting groove.

7. The wireless induction lamp according to claim 1, wherein the lamp housing comprises a replaceable transparent pattern plate disposed thereon and correspondingly in position to the transparent part.

8. The wireless induction lamp according to claim 1, wherein the at least one first induction coil is formed by stacking and winding at least one coil.

9. The wireless induction lamp according to claim 1, wherein the at least one wireless light emitting device comprises a rectangular wireless light emitting device.

10. The wireless induction lamp according to claim 1, wherein the first induction coil is electrically connected to a resonance circuit board comprising at least one load element disposed thereon.

* * * * *